United States Patent [19]

Campbell

[11] 4,238,931
[45] Dec. 16, 1980

[54] WASTE HEAT RECOVERY SYSTEM CONTROLLER

[75] Inventor: Scott Campbell, Melbourne, Fla.

[73] Assignee: Energy Conservation Unlimited, Inc., Longwood, Fla.

[21] Appl. No.: 6,269

[22] Filed: Jan. 25, 1979

[51] Int. Cl.³ .............................................. F25B 39/04
[52] U.S. Cl. .................................. 62/183; 62/238 R; 126/420
[58] Field of Search .............. 126/420, 422; 62/238 E, 62/324, 183; 237/2 B

[56] References Cited

U.S. PATENT DOCUMENTS

| | | | |
|---|---|---|---|
| 1,130,870 | 3/1915 | Willsie | 126/422 |
| 3,922,876 | 12/1975 | Wetherington, Jr. | 62/238 E |
| 4,019,495 | 4/1977 | Frazier et al. | 126/420 |
| 4,141,222 | 2/1979 | Ritchie | 62/238 |

*Primary Examiner*—William E. Wayner
*Attorney, Agent, or Firm*—Duckworth, Hobby, Allen & Pettis

[57] ABSTRACT

In a system having a waste heat recovery subsystem utilizing a heat exchanger, such as a refrigeration system having a heat exchanger for extracting and recovering heat energy from the superheated refrigerant by means of a transfer fluid, method and apparatus for control of the heat recovery subsystem. A combination of three interactive control systems is provided for control of the flow of the heat transfer fluid through the heat exchanger. A first heat sensor means determines when the waste heat temperature is sufficiently high, controlling a pump to obtain circulation of the fluid when such temperature exceeds a preselected value. A second heat sensor means monitors the temperature of the heat transfer fluid and stops circulation of the fluid when such temperature exceeds a preselected safe upper limit. The second heat sensor means also controls the pump to circulate hot fluid through the heat exchanger when no waste heat is available and the subsystem is exposed to potentially freezing ambient temperature. Third heat sensor means monitors the transfer fluid temperature at the outlet of the heat exchanger and controls the rate of flow of the fluid in a manner proportional to such temperature.

13 Claims, 5 Drawing Figures

WASTE HEAT RECOVERY SYSTEM CONTROLLER

BACKGROUND OF THE INVENTION

1. Field of the Invention

The present invention relates to a system having a waste heat recovery subsystem having a heat exchanger for extracting and recovering waste heat from the waste heat medium by means of a transfer fluid, and in particular, relates to methods and apparatus for control of such heat recover systems.

2. Description of the Prior Art

With the present day emphasis on energy conservation, a number of various types of apparatus for use with refrigeration and air conditioning equipment have been developed in which the waste heat from the condensers can be recovered and used for various purposes. For example, many homes now utilize the waste heat from home air conditioners for heating water for domestic use with significant savings in energy and costs. An example of such art is U.S. Pat. No. 3,922,876 assigned to the assignee of the instant application, entitled "Energy Conservation Unit." This patent discloses heat recovery system which extracts heat from the superheated fluorocarbon refrigerant in an air conditioning system by passing water through a heat exchanger installed in the air conditioner refrigerant line to the condenser. In addition to supplying essentially free hot water, the additional cooling of the refrigerant increases the efficiency of the air conditioner, resulting in lower primary power consumption.

This system and similar prior art systems have been controlled, with respect to the flow of water through the heat exchanger, by a combination of thermostatically controlled valves and switches, and by the use of electrochemical relays. For example, it is necessary to control a pump located in the water line of the recovery system to move the supply of cold water through the heat exchanger and back to the water storage tank only during operational periods of the air conditioner. When the water reaches a pre-selected upper temperature, which may be selected on the basis of safety or the temperature required for a particular application, thermostatically contolled valves have been utilized to shut off the flow of water. In addition, switches and relays have been necessary to turn the pump off and on at the appropriate times.

These prior art control systems have a number of obvious disadvantages. Accurate thermostats which operate mechanically are relatively expensive and increase the cost of home installations. Low cost thermostats have been found to vary widely in their characteristics and may result in water either too hot or too cold for the intended use.

Another problem that has developed in such units stems from the necessity of having the heat exchanger in close proximity to the condenser, which is usually located in an outside environment. During cold weather, water in the lines to the heat transfer unit may freeze, resulting in serious damage to the system.

Many prior arty systems also require connections to the air conditioner electrical control circuits to operate the relays which prevent the water circulation through the heat exchanger except when the air conditioner is in operation. This approach, of course, has the disadvantage of requiring relays and requiring modification or connection to the air conditioner electrical system. Alternatively, other systems have depending upon a thermostat located at the outlet of the heat exchanger to control the pump. Thus, when the air conditioner first begins to operate, the pump will be off and there is no water flow through the heat exchanger. Initially, as the water in the heat exchanger becomes heated from the flow of hot refrigerant, there is no circulation of water taking place. Since the system depends upon heat reaching the external thermostat by conduction, water in the heat exchanger itself may reach a very high temperature and exceed a safe limit before the pump is activated.

SUMMARY OF THE INVENTION

The present invention is a novel control system for heat recovery systems which overcomes the disadvantages of the prior art systems and in addition, furnishes certain features and advantages not heretofore available. The invention is preferably implemented as an electronic controller in which no relays, thermostats or other mechanical devices are required. Thus, the maintenance and repair expenses are greatly reduced, especially with the use of long-life, solid state components.

The novel electronic controller utilizes three heat sensors. These sensors may be thermistors, or other electronic sensing elements. A first sensor is affixed to the refrigerant line from the compressor preferably immediately adjacent to the heat recovery heat exchanger unit, although the sensor may be at any point on the compressor-to-condenser line. This sensor is response to the temperature of the refrigerant in that line. A second sensor is attached to the water line preferably at the inlet of the heat recover system pump and effectively measures the temperature of the water entering the heat exchanger unit. The third heat sensor is attached at the water outlet line of the heat exchanger and determines the temperature of the water being delivered to the water storage system. The controller is preferably an electronic system having three inputs from the three respective heat sensors and an output connected to and controlling the pump. Means are provided for switching the pump off and on, and also for controlling the rate of flow of water produced by the pump.

The control circuits in the controller are preferably implemented by comparator and logic circuits. The signals derived from each of the three sensors are compared in the controller logic circuits, and respective ZERO or ONE logic signals are generated. The pump is then controlled by these logic signals. For example, an OR gate may be used to turn the pump off and on in two specific situations. First, if the air conditioner is not in operation, as in cold weather conditions, freeze protection for the water-containing portion of the heat exchanger system is accomplished by operating the pump to circulate hot water from the storage tank, heated therein by a back-up input energy source, such as gas, oil, or electric heaters. When the second sensor attached near the pump inlet senses dangerously low temperatures, for example, less than 40° F., the OR gate will receive a ONE logic level signal which is utilized to turn the pump on and therefore circulate hot water from the stroage tank through the heat exchanger, protecting it from freezing. When the outside temperature rises above an unsafe temperature, the ONE signal is removed by the logic level changing to ZERO and, assuming no other requirement, the pump would be turned off. Second, when the air conditioner is in operation, the refrigerant entering the heat exchanger must be at its high superheat temperature, and at the same time, the temperature of the water entering the heat exchanger must be below a selected safe high temperature level, for the pump to operate. Thus, the first sensor which is attached to the refrigerant line must sense a refrigerant temperature above a selected value and, simultaneously, the second sensor at the input to the pump must sense a temperature less than the safe upper temperature for the pump to operate. A three input AND gate may be utilized as a logic element to determine when the above-mentioned conditions are present. The logic signals derived from the refrigerant sensor and the inlet water sensor are inputs to two of the AND gate inputs, and a logic signal derived from the outlet water sensor is applied to the third input.

Assuming that ONE logic level signals are present from all three sensors indicative of an "operate" condition, the AND gate will output a logic level indicative of such condition which will be effective to energize the pump. As may be recognized, when the outlet water temperature becomes too high, tending to exceed the safe upper limit, the signal from the water inlet sensor will change to its ZERO logic level and the AND gate will be disabled, shutting the pump off. Similarly, as the air conditioner cycles to an off condition, or is turned off, the refrigerant temperature will drop, also resulting in a ZERO logic level at the AND gate, turning the pump off.

Advantageously, the controller includes circuitry for automatically varying the flow rate of the pump. As may be recognized when the heat exchanger is operating at its maximum temperature, it is desirable to maintain a greater flow of water through the exchanger is the case when the refrigerant temperature is increasing and the heat exchanger temperature is less than its maximum value. This variable rate function is performed by modulating the AC input power to the pump. The third heat sensor at the water output of the heat exchanger produces an electrical signal directly proportional to the water temperature at that point. This electrical signal is conditioned by an operational amplifier, producing a varying analog signal which represents one input to a comparator. The reference input to the comparator is supplied by a staircase waveform generator which provides a selected number of steps of voltage. The staircase waveform is synchronized to the 60 Hz power line. Thus, the analog water temperature signal from the heat sensor will result in an output from the comparator only when the staircase voltage is equal to or less than the voltage of the analog signal. As may be seen, the output of a comparator will be a series of varying width logic pulses with the widths thereof a function of the outlet water temperature. The output of the comparator represents one input to the three input AND gate as previously described. The AND gate output determined by the other two inputs thereto will therefore be effectively modulated or interrupted by the variable width pulses from the comparator. When modulated pulses are applied to the pump control, the result is a reduction in the average electrical energy to the pump thereby reducing its rotational speed. By synchronizing these modulated control pulses to the 60 Hz line, input electrical energy will be applied to the pump in integral cycles.

To solve the problem created by the delay in pump operation when the air conditioner is first turned on, a novel circuit is utilized in conjunction with the staircase waveform generator. A narrow pulses is generated therefrom having a rate of four per second and is applied to the third input of the AND gate via an OR gate which has the comparator connected to its other OR input. Thus, even though the sensor at the water outlet of the heat exchanger produces an analog signal less than the first staircase voltage and would ordinarily require no flow, the narrow pulses from this circuit will result in a low rate of operation of the pump and consequently a minimum flow through the heat exchanger. This minimum flow is sufficient to quickly indicate to the outlet water heat sensor that heating is taking place and thereby preventing possible unsafe temperatures within the heat exchanger prior to the pump becoming energized. The invention thus advantageously utilized five functional elements operating in cooperative combination to control the operation of a waste heat recovery subsystem under a variety of internal and external temperature conditions.

It is therefore a principal object of the invention to provide a novel method and means for efficiently controlling the extraction and recovery of heat from superheated refrigerant in a refrigeration unit.

It is another object of the invention to modulate the rate of flow of transfer fluid through a heat exchanger in such an energy recovery system with the resulting rate of flow being proportional to the outlet temperature of the transfer fluid.

It is still another object of the invention to provide means for stopping the flow of transfer fluid when the temperature reaches a pre-determined upper limit thereof.

It is yet another object of the invention to provide means for circulating hot fluid through the heat exchange when the heat exchanger may be a subject to low temperatures with danger of freezing.

It is a further object of the invention to provide a means of preventing circulation of the transer fluid through the heat exhanger when the refrigeration system is not in operation except under very low external temperatures.

It is still a further object of the invention to cause a minimum circulation rate of transfer fluid immediately after the refrigeration system begins operation.

It is yet a further object of the invention to provide an electronic control system for a heat recovery system having no moving parts, high reliability, and low maintenance requirements.

It is another object of the invention to provide an electronic controller which may be added to an existing heat recovery system without requiring electrical connection to the refrigeration system.

These and other objects and advantages of the invention will be apparent from the following detailed description with reference to the drawings.

DETAILED DESCRIPTION OF THE PREFERRED EMBODIMENT

Figure 1:
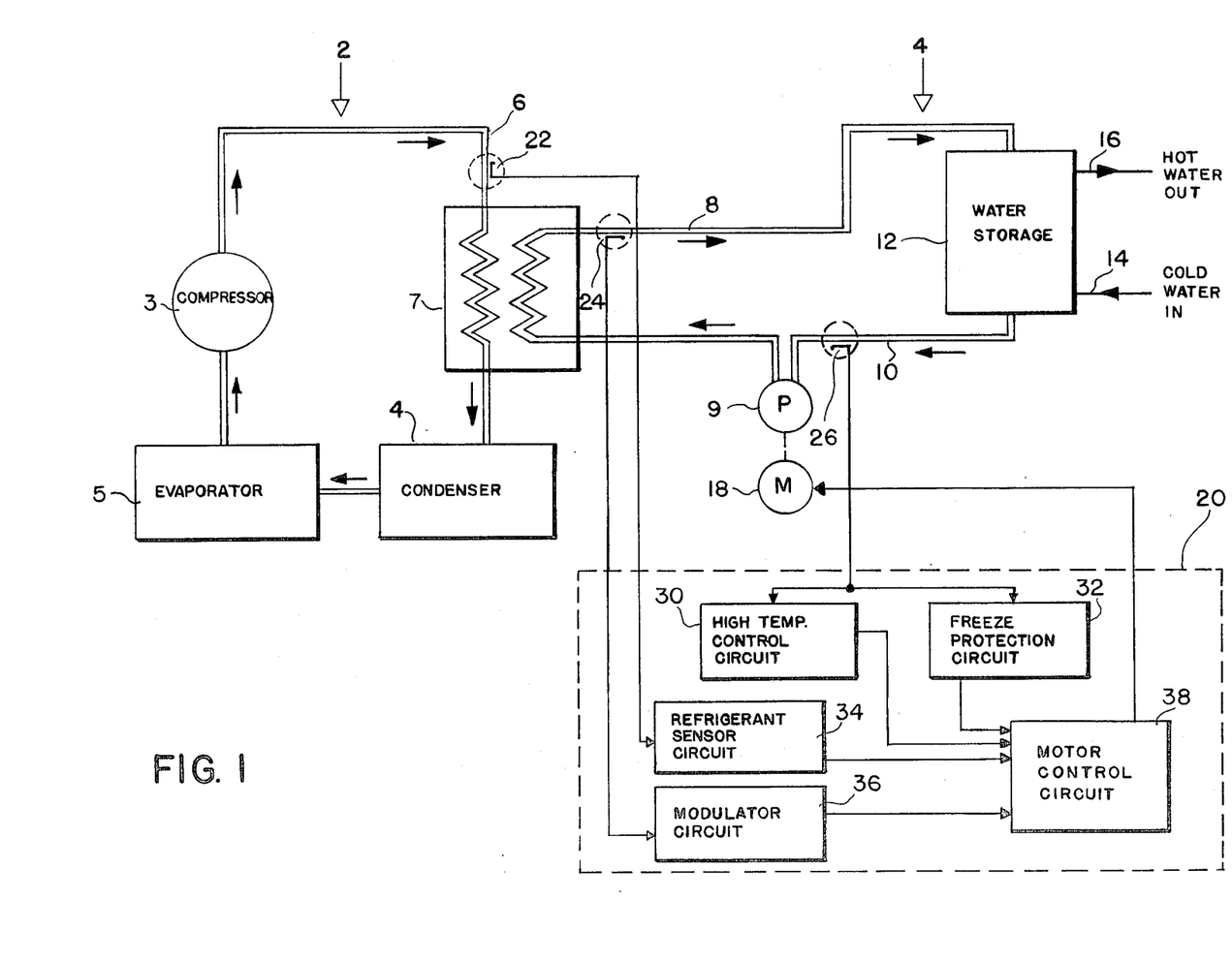
FIG. 1 is a functional block diagram of a typical refrigeration system having a waste heat recovery subsystem for heating water, with a controller in accordance with the invention.

Referring to FIG. 1, a typical refrigeration system is shown in schematic form generally at 2, having a heat exchanger 7 incorporated therein. Heat exchanger 7 operates in conjunction with a prior art heat recovery system shown generally at 4 to utilize heat generated during the refrigeration cycle which would otherwise be wasted. Cold water is supplied to water storage tank 12 via inlet 14, with heated water available from the storage tank on outlet line 16. Cold water is drawn from the bottom of the tank via line 10 by pump 9 interposed therein and delivered to heat exchanger 7. As the water flows through heat exchanger 7, it picks up thermal energy from the hot refrigerant passing therethrough with the heated water exiting exchanger 7 on line 8 and being returned to the water storage tank 12. It is also possible, of course, to have a separate heat transfer fluid circulated by pump 9 and heat exchange means in storage tank 12 to thereby heat the stored water indirectly.

Next, shown generally by 20, a waste recovery controller in accordance with the invention is illustrated in block diagram form. The interface with the heat recovery system is essentially external and requires no direct interconnection therewith. Three heat sensing devices 22, 24 and 26 are attached to appropriate points of the refrigeration and heat recovery system to provide inputs to the controller.

The basic control is obtained by varying the rate of flow through pump 9 by controlling motor 18. When no flow of water through heat exchanger 7 is desired, the controller 20 turns motor 18 off. Under conditions requiring circulation of water, motor 18 is energized by the controller 20. In addition, where certain conditions prevail in the system, the rate of flow of water is modulated by controlling the rotational speed of motor 18.

Five separate control functions are cooperatively provided by controller 20. These are:

1. Circuit 34 senses the temperature of the refrigerant on line 6 entering heat exchanger 7 by means of a heat sensor 22 affixed thereto at any convenient point along line 6. When the refrigerant temperature is low, as is the case when the refrigerant cycle is off, sensor circuit 34 inhibits the operation of pump motor 18 via motor control circuit 38. However, when the refrigeration system begins to operate, the temperature of the refrigerant gas in line 6 will quickly rise, producing a control signal in sensor circuit 34 which is utilized to start operation of pump motor 18, assuming other system conditions also are proper for desired operation of pump 9.

2. As the system continues to operate, hot water will be delivered to water storage 12 via line 8 by pump 9. Initially, the heat exchange rate may be relatively low before the refrigerant temperature has risen to its normal operate value; however, after the refrigerant reaches its normal high temperature value, the rate of heat transfer will then be high. Therefore, it is desirable to have a slow rate of flow of water through heat exchanger 7 during the initial operating time of the refrigeration system and to increase the rate of flow when the maximum refrigerant temperature is achieved. This mode of operation insures an essentially uniform transfer of energy, faster response time, and more efficient operation.

To achieve this desirable mode of operation, a modulator circuit 36 is utilized. The modulator circuit monitors the temperature of the water exiting heat exchanger 7 by means of a heat sensor 24 placed as close as possible to the heat exchanger outlet. When the temperature sensed by sensor 24 is relatively low, as will occur when the cycle is just beginning, motor control circuit 38 operates responsive to the output of modulator circuit 36 to cause motor M to rotate slowly, thereby producing a low effective water flow rate through pump 9. When the temperature of the water sensed by sensor 24 is high, modulator 36 then causes motor control circuit to increase the speed of motor 18 producing a higher rate of flow of pump 9. As will be explained in more detail below, the modulator circuit will produce a rate of flow directly proportional to the exit water temperature in line 8.

3. It is necessary to stop the flow of water through heat exchanger 7 at the point that a maximum safe water temperature or a desired storage water temperature is reached. To this end, a high temperature control circuit 30 is employed. A heat sensor 26 monitors the temperature of the water being fed from water storage 12 via line 10 to heat exchanger 7 and is preferably placed near the inlet port of pump 9. When a maximum safe water temperature is reached, which may be, for example 150° F., control circuit 30 causes motor control circuit 38 to interrupt power to motor 18, thereby turning pump 9 off. As the water temperature thereafter begins to drop, control circuit 30 will cause motor control circuit 38 to re-energize motor 18 and pump 9 begins again to circulate water through heat exchanger 7.

4. Heat sensor 26 is also utilized to initiate protection of water lines and heat exchanger 7 from freezing conditions. As may be recognized, these parts of an air conditioning system installation are normally in an outdoor environment. A safe minimum temperature is selected, for example 40° F., and freeze protection circuit 32 is arranged to cause motor control circuit 38 to operate pump motor 18 whenever the temperature of the water in line 10 is less than 40°. As may be understood, it is normal in systems of this type to have secondary energy sources for the water in storage tank 12, such that hot water is available even when the air conditioner is not in operation. For example, electric heaters, gas heaters, oil heaters, and the like are commonly used. Therefore, when pump 9 operates in such low temperature conditions, hot water from water storage tank 12 will be circulated through lines 10 and 8 and through heat exchanger 7, thereby protecting these elements from freeze damage.

5. Modulator circuit 36 is also in use when the refrigeration system 2 is first started and when the temperature of the water as determined by sensor 24 is still low. It is desirable to produce a slow rate of water flow through heat exchanger 7 to prevent excessive water temperature therein prior to start of normal pump operation. Therefore, circuit 36 produces a narrow pulsed controlled signal at a low repetition rate that controls motor 18 to produce a low rate of flow through heat exchanger 7 as soon as sensor 22 detects hot refrigerant in line 6.

Figure 2:
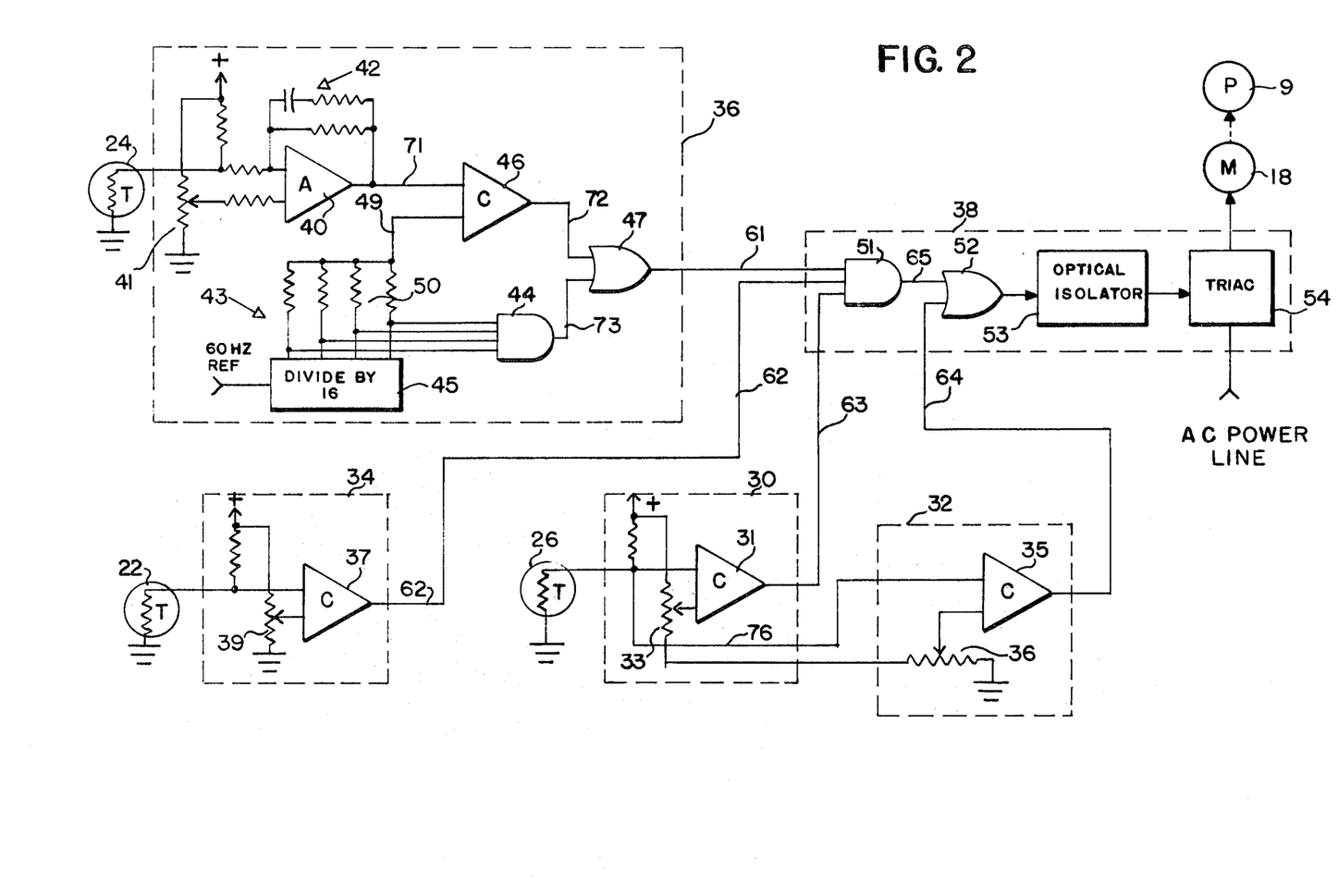
FIG. 2 is a more detailed functional block diagram of the waste heat recovery subsystem controller of FIG. 1.
Figure 3:
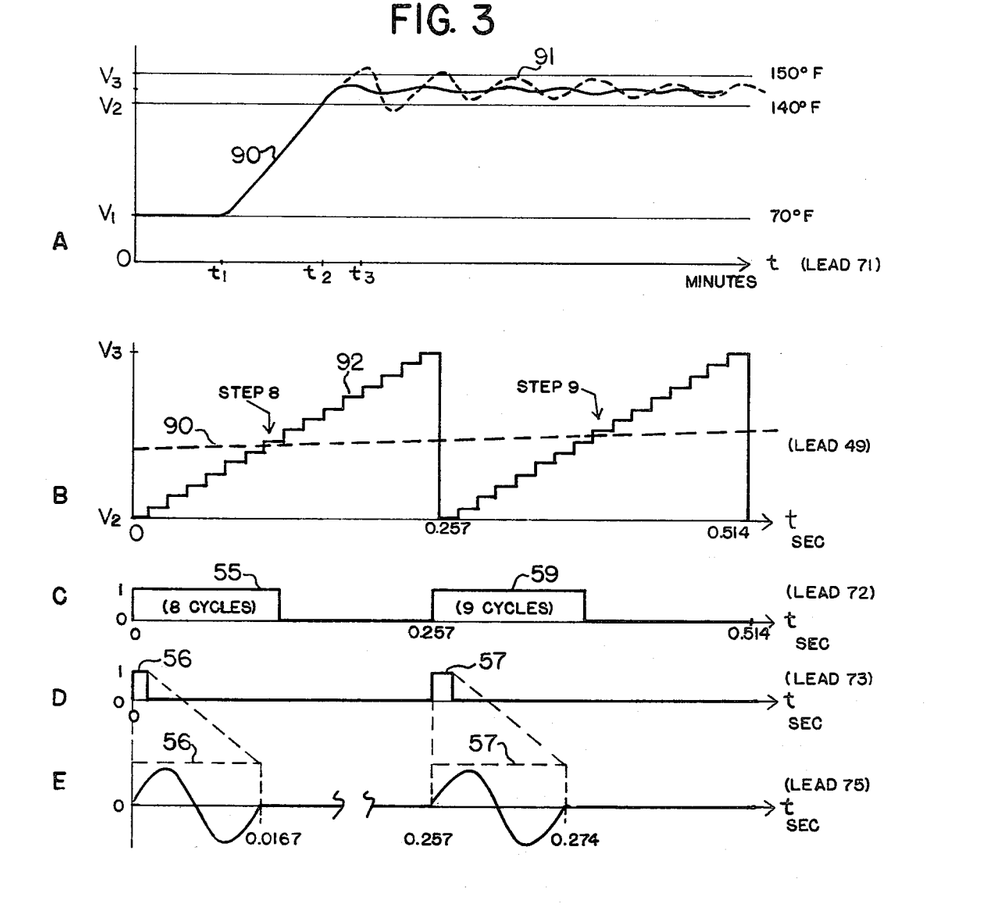
FIG. 3 is a set of waveform diagrams at various points of the controller of FIG. 2, with the waveforms shown as a function of time.
Figure 4:
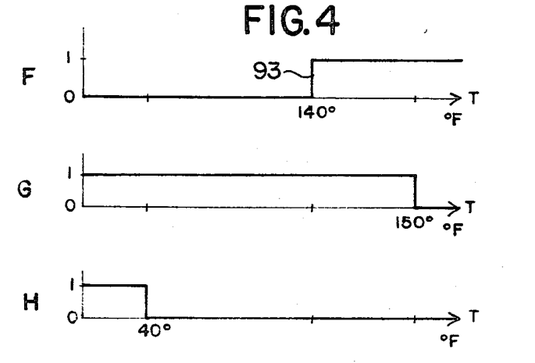
FIG. 4 is a set of logic level diagrams at various points of the controller of FIG. 2, shown as functions of temperature.

The operation of heat recovery controller 20 will now be more fully explained with the assistance of the more detailed functional block diagram of FIG. 2, and the waveform diagrams of FIGS. 3 and 4.

Motor control circuit 38 consists of logic circuits which apply appropriate logic level signals to optical isolator 53. When a logic ONE is present at isolator 53, triac 54, which acts as an electronic switch, conducts, applying AC power to pump drive motor 18. When a logic ZERO occurs, triac 54 interrupts power to motor 18. Motor 18, which may be a split-phase capacitor induction motor, will operate at full speed in response to a steady logic ONE at isolator 53, and will operate at reduced speed in response to a series of logic ONE pulses.

Inputs to motor control circuit 38, as previously described, are derived from logic circuits associated with the three temperature sensors 22, 24 and 26. Referring first to block 36 which represents the modulator circuits, the operation of this element will now be explained. The input from heat sensor 24, which may be a thermistor, connects to operational amplifier 40 via a bridge circuit as shown. Amplifier 40 utilizes DC feedback to control its gain, and AC feedback to control the system response as discussed hereinbelow. The output of operational amplifier 40 on lead 71 represents an analog voltage proportional to the temperature sensed by thermistor 24. For example, in FIG. 3, a typical signal 90 appearing on lead 71 is shown at A. Assume that the refrigeration system is not operating, no heat is present in heat exchanger 7, and the water in line 8 is at the supply temperature, for example, 70° F. In this condition, the circuit produces a voltage $V_1$ representative of the 70° temperature. At $t_1$, the refrigeration system begins operating and the water in line 8 begins to increase in temperature as indicated. The voltage on lead 71 will increase in an essentially linear fashion. At time $t_2$ the voltage is now $V_2$. The water continues to increase in temperature until it reaches an upper limit which may be, for example, 150° at time $t_3$. At this point, pump 9 is turned off as will be explained hereinbelow. As the water in line 8 tends to cool, the drop in water temperature will result in re-starting the pump 9 and as may now be recognized the water temperature would tend to cycle between 140° and 150° F. as shown by the dashed curve 91. RC compensation network 42 is utilized in a feedback loop from the output of operational amplifier 40 to its input and is selected to control the water temperature so as to maintain a smooth, relatively constant temperature as shown by curve 90. Potentiometer 41 is used to set the voltage level of lead 71 to a desired value.

The waveform shown at A on lead 71 is applied to one input of comparator 46. The reference input of comparator 46 is fed from a staircase waveform generator, shown generally at 43, via lead 49. The staircase waveform is generated by divide-by-16 circuit 45 with its outputs summed by resistor network 50 to produce a typical staircase voltage waveform 92 as shown on lead 49 of FIG. 3, line B. A 60 Hz reference obtained from the AC power line is used to synchronize the staircase waveform with each step representing exactly one complete AC cycle. As the staircase reference rises, starting at zero time as shown on line B in FIG. 3, the voltage will step up from $V_2$ towards $V_3$. In the example illustrated, the voltage on lead 71 is assumed to be rising from $V_2$ to $V_3$. Comparator 46 produces a logic 1 at its output on lead 72 as long as the staircase voltage is less than the lead 71 voltage. For purposes of example, the first staircase waveform exceeds the lead 71 voltage at step 8 and the output of comparator 46 goes to logic ZERO as indicated in FIG. 3, line C. At the next staircase waveform voltage restart, another logic ONE pulse will begin since the sensor circuit voltage is less than the staircase voltage. In this instance, the logic ONE will be sustained until the ninth staircase step has occurred which exceeds the sensor voltage, thereby producing a slightly longer pulse 59. The result will be a sequence of pulses on lead 72 of varying widths as determined by the staircase step at which the comparator 46 was triggered. Line C, FIG. 3, represents two successive pulses 55 and 59 for example illustrated.

As may now be seen, as the temperature of the water rises toward 150°, the voltage on lead 71 rises towards $V_3$, producing progressively longer pulses. Finally, when $V_3$ is reached, comparator 46 will produce a steady logic ONE output on lead 72. Lead 72 drives OR gate 47; therefore, any signal appearing on lead 72 will also appear at the output of OR gate 47 on lead 61 which represents the first input to three-input AND gate 51.

For a logic ONE to appear at the output of AND gate 51, the other two inputs must also be at a logic ONE level. Accordingly, lead 62 is fed by the refrigerant sensor circuit 34 which consists of thermistor 22 connected in a bridge circuit and arranged to sense the refrigerant temperature at the input to heat exchanger 7. Potentiometer 39 furnishes the reference voltage to comparator 37 and is set, for example, to cause comparator 37 to produce a logic ONE on lead 62 when 140° F. is reached. In FIG. 4, a plot of the output 93 on lead 62 as a function of temperature is shown on line F and a logic ONE is thus seen to occur on lead 62 at any time sensor 22 is above 140° F.

Lead 63 is driven from high temperature control circuit 30. Circuit 30 consists of comparator 31 driven by thermistor 26, connected in a bridge circuit which monitors water temperature at the input to pump 9. Comparator 31 is arranged to produce a logic ONE level on its output lead 63 only when the temperature of thermistor 26 is less than 150° F. This temperature represents a typical safe maximum temperature useful for the stored water. Thus, by the setting of potentiometer 33, a logic ONE will be present on lead 63 when the temperature is below 150° as illustrated on line G of FIG. 4.

As may now be recognized, the inputs to three-input AND gate 51 will all be present for temperatures of the water between 140° and 150°. In such a condition, a ONE will appear on lead 65 from AND gate 51 which is applied to one input of OR gate 52, and therefore will appear at optical isolator 53, energizing motor 18 as previously described. If the water temperature is at or very near 150°, it may be seen that lead 72 will be at a steady logic ONE and the pump will run at maximum speed. However, if the water temperature is less than 150°, the waveform on lead 72 will represent a series of pulses causing triac 54 to pulse motor 18 off and on. Thus, the average speed of motor 18 will be reduced. Advantageously, motor 18 and pump 9 will run at their lowest speed when the water temperature is about 140°. Thus, the rate of flow of water is reduced at a time when the temperature differential is low and as the water temperature increases, the pump produces a greater rate of flow maintaining a relatively constant heat flow. When compensation network 42 is properly selected to match the pump and heat recovery system responses, the steady state water temperature in water line 8 will vary slightly between step 8 and step 9 of the staircase waveform 92 rather than oscillating as shown by dashed curve 91 of FIG. 3, line A.

The staircase waveform generator 43 is synchronized with the 60 Hz power line and arranged so that pulses produced on lead 72 will start at a zero crossing of the AC power line voltage and terminate at a zero crossing. This advantageously prevents transients which could cause radio interference. This action is illustrated on line E of FIG. 3 showing the voltage on lead 55 in which two single staircase pulses 56 and 57 are shown, such as may appear on lead 73, line D, as will be explained more fully below. As may be noted, exactly one cycle of the power line is operative with respect to motor 18 with the interruptions at the zero crossings.

When the refrigerant temperature sensed by thermistor 22 is less than 140°, there will be a logic ZERO on lead 62 to AND gate 51, as shown on line F, FIG. 4, with the result that motor 18 will not receive an operate pulse through AND gate 51. However, during the winter months when an air conditioning system is not in use, there is danger of damage to heat exchanger 7 as well as water lines 8 and 10 and, in some instances, pump 9 where such elements are exposed to an outdoor environment. To protect the system against such damage, the invention advantageously utilizes heat sensor 26 to sense when the temperature begins to drop toward freezing. For example, when the temperature reaches 40°, freeze protection circuit 32 consisting of comparator 35 will produce a logic ONE 95 at its output lead 64 as shown in FIG. 4, line H. The logic ONE signal on lead 64 is passed by OR gate 52 to optical isolator 53 which will then operate triac 54, turning on motor 18 and pump 9. For hot water systems in which there will be periods of non-operation of refrigeration system 2, secondary heating means are normally provided. Thus, hot water will be present in water storage tank 12 under such conditions. Pump 9 will therefore circulate a small part of this hot water through lines 8 and 10 and heat exchanger 7, protecting these elements from freezing. Potentiometer 36 is used to set the threshold temperature desired for comparator 45.

Turning back to modulator circuit 36, the staircase waveform generator 43 is used to advantage to insure flow of water in heat exchanger 7 as soon as the desired refrigerant temperature is reached as sensed by thermistor 22. This feature makes it unnecessary for thermistor 24 at the water output water line of heat exchanger 7 to reach its normal cut-on temperature of say 140° F. With no circulation of water through heat exchanger 7, such increase would necessarily result from conduction and very high temperatures of water in heat exchanger 7 could well occur before flow is initiated. The four outputs from divide-by-16 circuit 45 are fed to inputs of four-input AND gate 44. Four inputs will be present for only one period of the divide-by-16 count. Thus, a logic ONE pulse will appear at output lead 73 for each 16 counts. This logic ONE output represents an input to OR gate 47 and will therefore appear on lead 61. With pump 9 not running, sensor 22 at 140° F. or above, and sensor 26 below 150° F., three-input AND gate 51 will then pass the single logic ONE pulse at its output lead 65 which is effective in supplying power to the motor for the one period. Motor 18 will then operate at its minimum rate of speed from the resulting sequence of pulses from AND gate 44 as indicated by line D and line E of FIG. 4. The circulation of water from the pump operating at low speed will prevent excessive temperatures from occurring in heat exchanger 7. As the water temperature increases and rises above 140° F., the rate of flow will thereafter be increased as previously described by the varying width pulses then appearing at the output of comparator 46.

Figure 5:
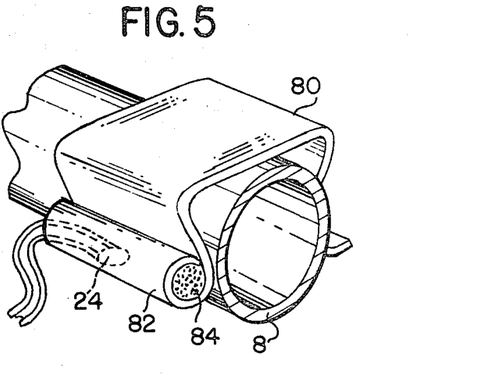
FIG. 5 is a perspective view of the thermistor holding clip shown attached to a cross-sectional view of a water line.

The thermistors 22, 24 and 26 are conveniently mounted without physically modifying the water or refrigerant lines. As shown in FIG. 5, a phosphor bronze spring clip 80 includes a tubular receptacle 82 at one end, with the thermistor inserted therein and secured with heat-conductive epoxy cement 84. The clip 80 is snapped onto a fluid line, such as a copper water line 8, with the tension of the clip holding the thermistor-containing end 82 in secure contact with line 8.

A list of specific components which may be used in the preferred embodiment of the invention is presented in the appendix. However, this list is for example only, and many variations and substitutions will be obvious to those of ordinary skill in the art in the light of the above disclosure. For example, many types of electronic temperature sensing elements are available and may be substituted for the preferred thermistors. Similarly, other types of fluid flow controls may be used. Although such implementations would not have the advantages of the electronic controls of the preferred embodiment, thermostatic-mechanical valves and flow controls may be used without departing from the spirit or scope of the invention.

The invention has been disclosed with reference to waste heat recovery from a refrigeration or air conditioning system. However, the novel controller is equally applicable to subsystems for recovering waste heat energy present in any medium and from a wide variety of industrial and domestic equipment, such as washing machinery, cooking processes, industrial processing equipment and the like.

Thus, a novel waste heat recovery controller has been disclosed that combines several elements, operating in combination and cooperation to provide specific control functions for several interacting conditions occurring at various points in the waste heat recovery system to be controlled. A distinct synergistic effect is apparent when the combination is viewed as a whole, and results in a low-cost controller increasing safety, efficiency, and convenience of operation over prior art devices of this type.

| APPENDIX | | |
|---|---|---|
| Component | Model No. | Manufacturer |
| Operational amplifier | CA 3410 | RCA |
| Comparator | LM 339 | National Semi-Conductor |
| Logic elements | 4024 (CMOS) 4001 (CMOS) 4002 (CMOS) | |
| Thermistor | FA 41J1 | Fenwal |
| Pump and Motor | UM 25-18 | Grundfos |

I claim:

1. In a system having a subsystem for recovery of waste heat from a medium utilizing a heat exchanger and a transfer fluid, and having a pump for circulation of the transfer fluid, the method of control of the subsystem comprising the steps of:
   pumping the transfer fluid through the heat exchanger;

sensing the temperature of the transfer fluid after exiting the heat exchanger in a manner proportional to such sensed temperature;

sensing the waste heat medium temperature at the input of the heat exchanger; and maintaining a minimun rate of flow of the transfer fluid through a heat exchanger without regard to such outlet temperature when the waste heat medium temperature is greater than a first pre-selected value.

2. The method as defined in claim 1 which comprises the additional steps of:

sensing the temperature of the transfer fluid to be heated in the heat exchanger; and halting the flow of the transfer fluid when such input temperature exceeds a second pre-selected value.

3. The method as defined in claim 2 which includes the additional step of initiating maximum rate of flow of the transfer fluid when the input temperature is less than a third pre-selected value, such pre-selected value being less than the second pre-selected value.

4. In a refrigeration system having a heat exchanger for extracting and recovering heat from the superheated refrigerant by means of a transfer fluid, apparatus for controlling the flow of the transfer fluid comprising:

pump means for causing transfer fluid to flow through the heat exchanger, said pump means having a controllable flow rate;

temperature sensing means disposed so as to sense the temperature of transfer fluid at the outlet of the heat exchanger; and control means, operatively connected to said temperature sensing means and to said pump means, for controlling the flow rate of said pump means in a manner proportional to the outlet temperature of the transfer fluid, said control means having modulator means for varying input power to said pump means and compensation means for maintaining the stability of operation of the resulting control function.

5. The apparatus as defined in claim 4 in which:

said temperature sensing means is thermistor means for producing a first electrical signal proportional to the outlet temperature of the transfer fluid; and said modulator includes a comparator having as a first input such first electrical signal, a staircase waveform generator having an output representing a second input to said comparator wherein the output of said comparator is a sequence of pulses having widths which vary in proportion to such outlet temperature.

6. The apparatus as defined in claim 5 in which said pump means is driven by an electric motor and in which said control means further comprises:

electronic switching means for controlling electrical power to the electric motor, said switching means responsive to the widths of the comparator output pulses thereby varying the speed of said pump means in a manner proportional to such outlet temperatures.

7. The apparatus as defined in claim 6 in which said staircase waveform generator is synchronized to the power line frequency whereby such comparator output pulses are integral numbers of complete cycles of electrical power.

8. In a refrigeration system having a heat exchanger for extracting and recovering heat from the superheated refrigerant by means of a transfer fluid and a fluid transfer pump, apparatus for controlling the flow of the transfer fluid comprising:

thermistor means for sensing refrigerant temperature at the inlet to the heat exchanger, said thermistor means producing an electrical signal representative of the temperature of the refrigerant; and pump control means connected to said thermistor means and responsive thereto for allowing pump to operate only when such refrigerant temperature exceeds a pre-selected value, said pump control means including a comparator for comparing such electrical signal with a pre-selected reference signal, said comparator producing a pump enabling pulse when the electrical signal exceeds such pre-selected reference signal.

9. The apparatus as defined in claim 8 in which said pump is driven by an electric motor and in which said control means further comprises:

electronic switching means for turning the electric motor off and on.

10. In a refrigeration system having a heat exchanger for extracting and recovering heat from the superheated refrigerant by means of a transfer fluid and a fluid transfer pump apparatus for controlling the flow of the transfer fluid comprising:

thermistor means disposed so as to sense the temperature of the inlet transfer fluid for producing an electrical signal proportional to the temperature of the transfer fluid;

a comparator connected to said temperature sensing means and to the pump for disabling operation of the pump when the temperature of the transfer fluid exceeds a first pre-selected value, said comparator for comparing such electrical signal to a pre-selected reference signal representative of the first pre-selected value, wherein said comparator producing a pump disabling pulse when the electrical signal exceeds such first pre-selected reference signal; and said comparator connected to said thermistor and to the pump for controlling the pump to operate when the temperature of the transfer fluid is less than a second pre-selected value, such second pre-selected value being lower than such first pre-selected value, said second comparator for comparing electrical signal to a second pre-selected reference value, said second comparator producing a pump enabling pulse when the electrical signal is less than such second pre-selected reference signal.

11. The apparatus as defined in claim 10 in which said pump is driven by an electric motor and in which said control means further comprises:

electronic switching means for turning the electric motor off and on.

12. In a refrigeration system having a heat exchanger for extracting and recovering heat from the superheated refrigerant by means of a transfer fluid, apparatus for controlling the flow of the transfer fluid comprising in combination:

pump means for causing transfer fluid to flow through the heat exchanger, said pump means having a controllable flow rate;

first temperature sensing means disposed so as to sense the temperature of transfer fluid at the outlet of the heat exchanger;

pump control means, operatively connected to said first temperature sensing means and to said pump means, for controlling the flow rate of said pump means in a manner proportional to the outlet temperature of the transfer fluid;

second temperature sensing means for sensing refrigerant temperature at the inlet to the heat exchanger, said pump control means connected to said second temperature sensing means and responsive thereto for allowing the pump to operate only when such refrigerant temperature exceeds a first pre-selected value;

third temperature sensing means disposed so as to sense the temperature of the transfer fluid to be heated in the heat exchanger;

high temperature control means connected to said third temperature sensing means and to said pump control means for disabling operation of the pump when the temperature of the transfer fluid exceeds a second pre-selected value; and low temperature control means connected to said third temperature sensing means and to said pump control means for controlling the pump to operate when the temperature of the transfer fluid is less than a third pre-selected value, such third pre-selected value being lower than such first pre-selected value.

13. In a system having a waste heat recovery subsystem utilizing a heat exchanger and a transfer fluid, apparatus for controlling the flow of the transfer fluid comprising in combination:

pump means for causing transfer fluid to flow through the heat exchanger, said pump means having a controllable flow rate;

first temperature sensing means disposed so as to sense the temperature of transfer fluid at the outlet of the heat exchanger;

pump control means, operatively connected to said first temperature sensing means and to said pump means, for controlling the flow rate of said pump means in a manner proportional to the outlet temperature of the transfer fluid;

second temperature sensing means for sensing the waste heat medium temperature at the inlet to the heat exchanger, said pump control means connected to said second temperature sensing means and responsive thereto for allowing the pump to operate only when such waste heat medium temperature exceeds a first pre-selected value;

third temperature sensing means disposed so as to sense the temperature of the transfer fluid to be heated in the heat exchanger;

high temperature control means connected to said third temperature sensing means and to said pump control means for disabling operation of the pump when the temperature of the transfer fluid exceeds a second pre-selected value; and low temperature control means connected to said third temperature sensing means and to said pump control means for controlling the pump to operate when the temperature of the transfer fluid is less than a third pre-selected value, such third pre-selected value being lower than such first pre-selected value.

* * * * *